United States Patent
Toyama et al.

(10) Patent No.: US 12,335,386 B2
(45) Date of Patent: Jun. 17, 2025

(54) ENCRYPTION TERMINAL, ENCRYPTION MANAGEMENT DEVICE, ENCRYPTED COMMUNICATION SYSTEM, AND METHOD

(71) Applicant: NEC Corporation, Tokyo (JP)

(72) Inventors: Hiroyuki Toyama, Tokyo (JP); Misao Ishihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 17/910,294

(22) PCT Filed: Mar. 25, 2020

(86) PCT No.: PCT/JP2020/013267
§ 371 (c)(1),
(2) Date: Sep. 8, 2022

(87) PCT Pub. No.: WO2021/192078
PCT Pub. Date: Sep. 30, 2021

(65) Prior Publication Data
US 2023/0155827 A1    May 18, 2023

(51) Int. Cl.
*H04L 9/08* (2006.01)
*H04L 9/06* (2006.01)
*H04L 9/14* (2006.01)

(52) U.S. Cl.
CPC .......... *H04L 9/088* (2013.01); *H04L 9/0618* (2013.01); *H04L 9/0894* (2013.01); *H04L 9/14* (2013.01)

(58) Field of Classification Search
CPC .......... H04L 9/088; H04L 9/14; H04L 9/0618
See application file for complete search history.

(56) References Cited

U.S. PATENT DOCUMENTS

| | | | | |
|---|---|---|---|---|
| 9,141,822 B2* | 9/2015 | Lehnhardt | ............ | G06F 16/235 |
| 10,484,177 B2* | 11/2019 | Hamlin | ............... | G06F 12/1408 |
| 10,721,059 B2* | 7/2020 | Choi | ..................... | H04L 9/0631 |
| 10,965,454 B2* | 3/2021 | Moon | ................... | H04L 9/0618 |
| 11,177,950 B2* | 11/2021 | Lo | ........................... | H04L 9/083 |
| 11,444,784 B2* | 9/2022 | Hatti | ...................... | H04L 9/006 |
| 11,556,271 B2* | 1/2023 | Lee | ......................... | G06F 16/22 |
| 11,636,214 B2* | 4/2023 | Ndu | ...................... | G06F 21/577 |
| | | | | 726/22 |

(Continued)

FOREIGN PATENT DOCUMENTS

| | | | |
|---|---|---|---|
| JP | 2001-069133 A | 3/2001 | |
| JP | 2001-125481 A | 5/2001 | |

(Continued)

OTHER PUBLICATIONS

International Search Report for PCT Application No. PCT/JP2020/013267, mailed on Jun. 2, 2020.

(Continued)

*Primary Examiner* — Viral S Lakhia

(57) ABSTRACT

An encryption terminal includes a terminal communication unit that receives an encryption algorithm for creating ciphertext from plaintext, the encryption algorithm being encrypted using a first one-time key in a one-time pad method, a terminal storage unit that stores a key table containing a second one-time key corresponding to the first one-time key, and a decryption unit that decrypts the encrypted encryption algorithm by using the second one-time key.

5 Claims, 11 Drawing Sheets

(56) References Cited

U.S. PATENT DOCUMENTS

| | | | |
|---|---|---|---|
| 11,709,609 B2* | 7/2023 | Tsai | G06F 3/0641 |
| | | | 711/162 |
| 12,143,481 B2* | 11/2024 | Lo | H04L 9/50 |
| 2022/0069983 A1* | 3/2022 | Yoshida | H04L 9/12 |
| 2022/0191011 A1* | 6/2022 | Kane | H04L 9/0656 |
| 2022/0284135 A1* | 9/2022 | Hubis | G06F 21/805 |
| 2022/0400007 A1* | 12/2022 | Yoshida | H04L 9/088 |
| 2023/0126583 A1* | 4/2023 | Ishida | H04L 9/3236 |
| | | | 713/168 |
| 2023/0163955 A1* | 5/2023 | Niihara | H04L 9/0891 |
| | | | 713/171 |

FOREIGN PATENT DOCUMENTS

| | | |
|---|---|---|
| JP | 2001-127747 A | 6/2001 |
| JP | 2003-333023 A | 11/2003 |
| JP | 2003-337753 A | 11/2003 |
| JP | 2006-133639 A | 5/2006 |
| WO | 2009/081896 A1 | 7/2009 |

OTHER PUBLICATIONS

JP Office Communication for JP Application No. 2022-509868, mailed on Oct. 17, 2023 with English Translation.

\* cited by examiner

ENCRYPTION TERMINAL, ENCRYPTION MANAGEMENT DEVICE, ENCRYPTED COMMUNICATION SYSTEM, AND METHOD

This application is a National Stage Entry of PCT/JP2020/013267 filed on Mar. 25, 2020, the contents of all of which are incorporated herein by reference, in their entirety.

TECHNICAL FIELD

The present disclosure relates to an encryption terminal, an encryption management device, an encrypted communication system, a method, and a non-transitory computer readable medium.

BACKGROUND ART

An information terminal having highly confidential information uses an encryption algorithm embedded in advance when communicating with another information terminal through a network as a known technique. However, such an embedded encryption algorithm can be compromised by attacks from outsiders, enhanced computational capability of computers and the like. To protect against such compromise, Patent Literature 1 discloses a technique that delivers data containing a new encryption algorithm encrypted using a common key from a center device to a terminal device through a network.

CITATION LIST

Patent Literature

PTL1: Japanese Unexamined Patent Application Publication No. 2001-127747

SUMMARY OF INVENTION

Technical Problem

In the method disclosed in Patent Literature 1, there is a possibility that an encrypted encryption algorithm is decrypted by an outsider when leakage of information of a common key occurs. Thus, the security of delivering an encryption algorithm is not high enough, and therefore the security of encrypted communication through a terminal device is not sufficient.

In view of the foregoing, it is an object of the present disclosure to provide an encryption terminal, an encryption management device, an encrypted communication system, a method, and a non-transitory computer readable medium capable of improving the security of encrypted communication.

Solution to Problem

An encryption terminal according to one aspect of the present disclosure includes a terminal communication unit configured to receive an encryption algorithm for creating ciphertext from plaintext, the encryption algorithm being encrypted using a first one-time key in a one-time pad method; a terminal storage unit configured to store a key table containing a second one-time key corresponding to the first one-time key; and a decryption unit configured to decrypt the encrypted encryption algorithm by using the second one-time key.

An encryption management device according to one aspect of the present disclosure includes an encryption unit configured to encrypt an encryption algorithm for creating ciphertext from plaintext by using a first one-time key in a one-time pad method; and a management communication unit configured to transmit the encrypted encryption algorithm to an encryption terminal including a key table containing a second one-time key corresponding to the first one-time key.

An encrypted communication system according to one aspect of the present disclosure includes an encryption management device including an encryption unit configured to encrypt an encryption algorithm for creating ciphertext from plaintext by using a first one-time key in a one-time pad method, and a management communication unit configured to transmit the encrypted encryption algorithm; and an encryption terminal including a terminal communication unit configured to receive the encrypted encryption algorithm, a terminal storage unit configured to store a key table containing a second one-time key corresponding to the first one-time key, and a decryption unit configured to decrypt the encrypted encryption algorithm by using the second one-time key.

A method according to one aspect of the present disclosure includes a communication step of receiving an encryption algorithm for creating ciphertext from plaintext, the encryption algorithm being encrypted using a first one-time key in a one-time pad method; and a decryption step of decrypting the encrypted encryption algorithm by using a second one-time key in a key table containing the second one-time key corresponding to the first one-time key.

A non-transitory computer readable medium according to one aspect of the present disclosure stores a program causing a computer to execute a communication step of receiving an encryption algorithm for creating ciphertext from plaintext, the encryption algorithm being encrypted using a first one-time key in a one-time pad method; and a decryption step of decrypting the encrypted encryption algorithm by using a second one-time key in a key table containing the second one-time key corresponding to the first one-time key.

Advantageous Effects of Invention

According to the present disclosure, there are provided an encryption terminal, an encryption management device, an encrypted communication system, a method, and a non-transitory computer readable medium capable of improving the security of encrypted communication.

EXAMPLE EMBODIMENTS

First Example Embodiment

Figure 1:
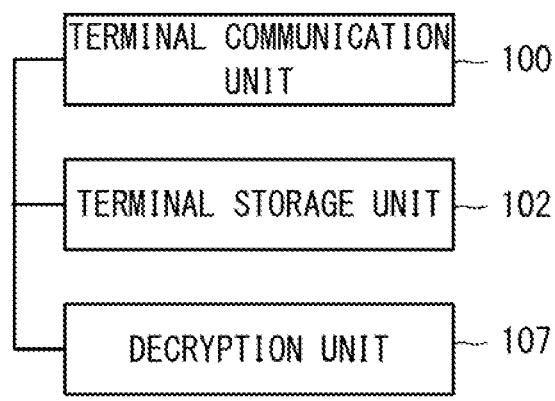
FIG. 1 is a block diagram showing the configuration of an encryption terminal according to a first example embodiment.

A first example embodiment of the present disclosure will be described hereinafter with reference to FIG. 1. FIG. 1 is a block diagram showing the configuration of an encryption terminal 10 according to the first example embodiment. The encryption terminal 10 includes a terminal communication unit 100, a terminal storage unit 102, and a decryption unit 107.

The terminal communication unit 100 receives an encrypted encryption algorithm. The encryption algorithm is an encryption algorithm for creating ciphertext from plaintext. The encryption algorithm is encrypted using a first one-time key in one-time pad method.

The terminal storage unit 102 stores a key table that contains a second one-time key corresponding to the first one-time key.

The decryption unit 107 decrypts the encrypted encryption algorithm by using the second one-time key.

As described above, the encryption terminal 10 according to the first example receives an encryption algorithm encrypted using an information-theoretically secure key in one-time pad method, which prevents leakage of the key used. This enhances the security of delivering an encryption algorithm. The security of encrypted communication is thereby improved.

Further, since newly created encryption algorithms are delivered one after another, there is no need to excessively incorporate spare encryption algorithms into the encryption terminal 10. This minimizes the workload of installing the encryption terminal 10 and thereby minimizes the initial cost.

Further, since a decryption process of encrypted data using a one-time key in one-time pad method is executable with less computational resources, the encryption terminal 10 is applicable also to equipment with less computational resources such as IoT (Internet of Things) equipment, for example.

Second Example Embodiment

A second example embodiment of the present disclosure will be described hereinafter with reference to FIGS. 2 to 6.

Figure 2:
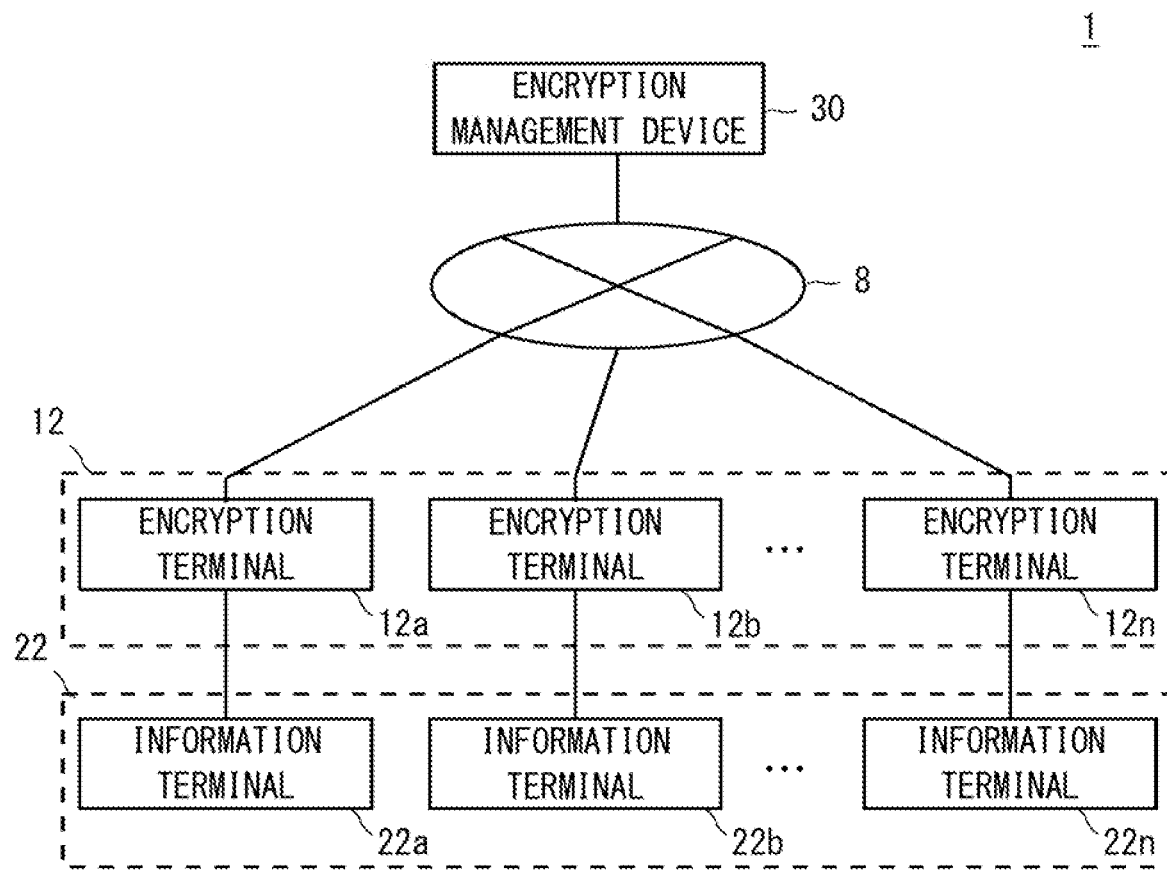
FIG. 2 is a schematic diagram of an encrypted communication system according to a second example embodiment.

FIG. 2 is a schematic diagram of an encrypted communication system 1 to which an encryption terminal according to the second example embodiment is applicable. The encrypted communication system 1 provides a function that allows a highly confidential information terminal to communicate with another information terminal through an encryption terminal for encrypted communication. The encrypted communication system 1 includes one or a plurality of encryption terminals 12, one or a plurality of information terminals 22, and an encryption management device 30. The one or plurality of encryption terminals 12 and the encryption management device 30 are connected so that they can communicate with each other through a network 8.

The network 8 includes various types of networks such as the Internet, a wide area network (WAN), and a local area network (LAN), or a combination of those networks. Further, the network 8 may include a dedicated line separated from the Internet. In the second example embodiment, the network 8 is the Internet.

The encryption terminal 12 performs encrypted communication of data using an encryption algorithm between another encryption terminal 12 connected to the network 8. Further, the encryption terminal 12 performs communication of data related to an encryption algorithm A with the encryption management device 30. The encryption terminal 12 is a personal computer, a notebook computer, a mobile phone, a smartphone, or another terminal device capable of inputting and outputting data.

The encryption terminal 12 is connected to the corresponding information terminal 22 so that they can communicate by a communication means other than the network 8. A communication means between the encryption terminal 12 and the information terminal 22 is wired or wireless, and it may be a private network, a Virtual Private Network (VPN), Near Field Communication or the like, for example.

For example, a first encryption terminal 12a encrypts data by using an encryption algorithm in response to receiving a request for encrypted communication of data whose destination is a second information terminal 22b from a first information terminal 22a to which it is connected. Then, the first encryption terminal 12a transmits the encrypted data to an encryption terminal 12b connected to the destination second information terminal 22b. Further, the first encryption terminal 12a decrypts data on the basis of the encryption algorithm in response to receiving a request for encrypted communication of data whose destination is the first information terminal 22a from the encryption terminal 12b connected to the second information terminal 22b. Then, the first encryption terminal 12a transmits the decrypted data to the destination first information terminal 22a.

Further, the encryption terminal 12 receives a new encryption algorithm from the encryption management device 30. The encryption terminal 12 receives the new encryption algorithm as encrypted data. The encryption terminal 12 decrypts the encrypted data and acquires a new encryption algorithm.

The information terminal 22 is a personal computer, a notebook computer, a mobile phone, a smartphone, or another terminal device capable of inputting and outputting data that performs encrypted communication of data containing confidential information with another information terminal 22.

For example, the first information terminal 22a transmits a request for encrypted communication of data whose destination is the second information terminal 22b to the first encryption terminal 12a to which it is connected. Further, the first information terminal 22a receives data transmitted from the second information terminal 22b and decrypted by the first encryption terminal 12a to which it is connected from the first encryption terminal 12a.

The encryption management device 30 is a computer such as a server computer that manages encryption algorithms to be used by one or a plurality of encryption terminals 12. A computer of the encryption management device 30 may be a computer whose functions are distributed among equipment on the network 8 and which is composed of the entire network 8. The encryption management device 30 encrypts a new encryption algorithm and transmits the encrypted new encryption algorithm to one or a plurality of encryption terminals 12.

Figure 3:
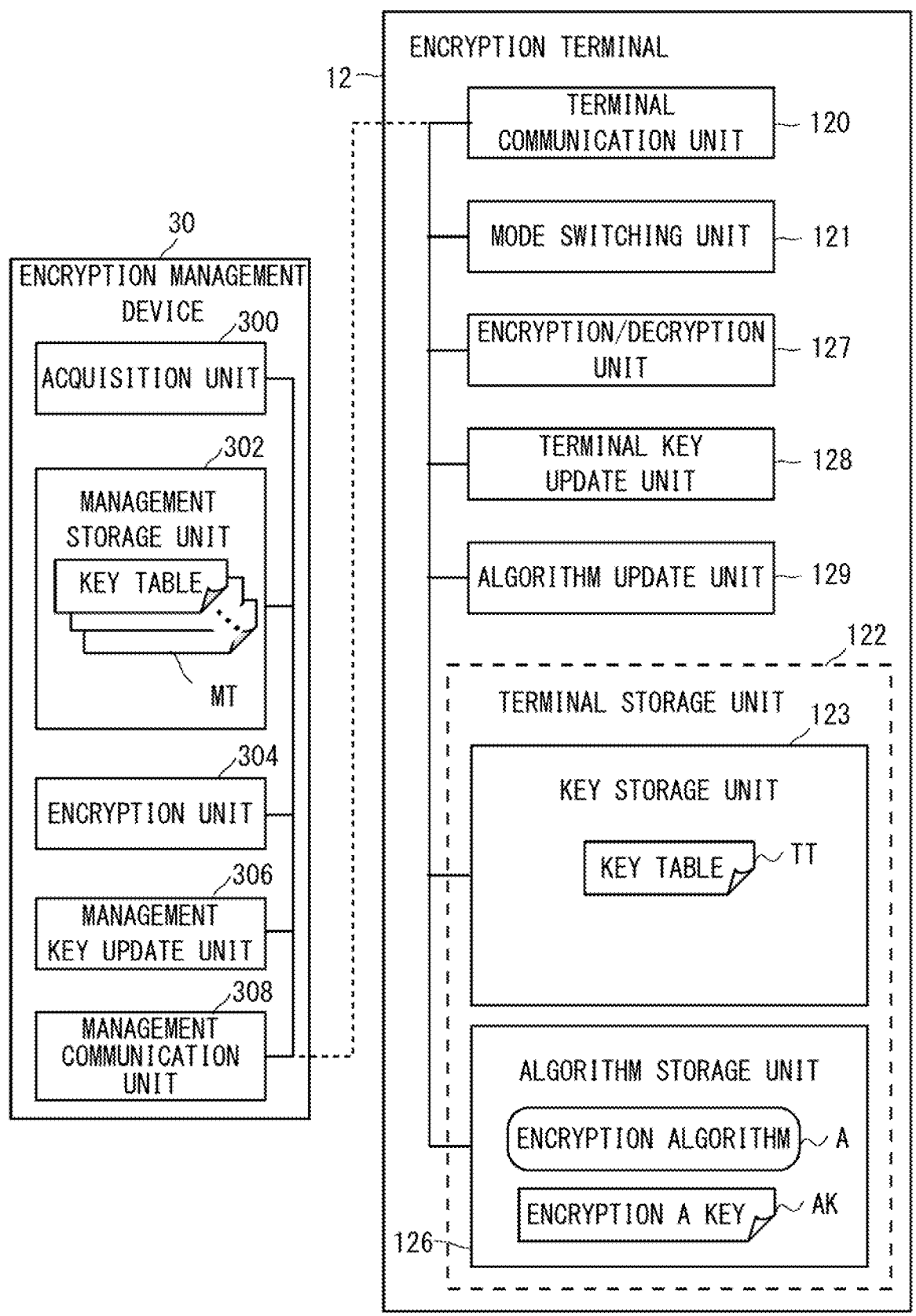
FIG. 3 is a block diagram showing the configuration of an encryption terminal and an encryption management device according to the second example embodiment.

FIG. 3 is a block diagram showing the configuration of the encryption terminal 12 and the encryption management device 30 according to the second example embodiment.

(Encryption Terminal 12)

The encryption terminal 12 includes a terminal communication unit 120, a mode switching unit 121, a terminal storage unit 122, an encryption/decryption unit 127, a terminal key update unit 128, and an algorithm update unit 129.

The terminal communication unit 120 performs various data communications with the encryption management device 30, another encryption terminal 12, and the destination information terminal 22. Particularly, the terminal communication unit 120 receives a new encryption algorithm A as data from the encryption management device 30. The encryption algorithm A includes an encryption algorithm for creating ciphertext from plaintext. In this second example embodiment, the encryption algorithm A further includes a decryption algorithm for decryption that creates plaintext from ciphertext, which corresponds to an encryption algorithm used for encryption. The data of the new encryption algorithm A received from the encryption management device 30 is encrypted using a first one-time key in one-time pad method. The terminal communication unit 120 supplies the encrypted new encryption algorithm to the encryption/decryption unit 127.

The mode switching unit 121 selects a decryption mode in response to receiving data by the terminal communication unit 120, and controls the encryption/decryption unit 127 according to the selected decryption mode. The decryption mode is a mode indicating the type of a data decryption scheme, which includes a normal mode and an update mode. In this second example embodiment, the normal mode is a mode that decrypts received data by using the current decryption algorithm contained in the current encryption algorithm A. The update mode is a mode that decrypts received data by using a second one-time key in a key table TT, which is described later.

The terminal storage unit 122 is a storage medium that stores various types of information related to encryption and decryption of data to be communicated. The terminal storage unit 122 inputs and outputs data with the encryption/decryption unit 127, the terminal key update unit 128 and the algorithm update unit 129. The terminal storage unit 122 includes a key storage unit 123 and an algorithm storage unit 126.

The key storage unit 123 stores the key table TT that contains the second one-time key that is used for decryption of data of a new encryption algorithm received from the encryption management device 30. The key table TT is a table of random numbers of one-time pad method, which is an encryption technique that performs decryption using a one-time random key. The second one-time key is a random key contained in the key table TT. The second one-time key may be a random number sequence of true random numbers having the same amount of data as the amount of data received. Note that the second one-time key may contain true random numbers different from one another for each encryption terminal 12. In other words, each of the plurality of encryption terminals 12 may have the key table TT containing a different second one-time key.

The algorithm storage unit 126 is a storage medium that stores various types of information to be used for encryption and decryption of data received from another encryption terminal 12 and the destination information terminal 22. The information stored in the algorithm storage unit 126 includes an encryption algorithm A and an encryption algorithm key AK.

The encryption algorithm A includes the current encryption algorithm A. The encryption algorithm A may further include a spare encryption algorithm A. The encryption algorithm key AK is a key that is applied to the encryption algorithm A. The encryption algorithm key AK may be a common key. The encryption algorithm key AK includes the current encryption algorithm key AK that is applied to the current encryption algorithm A. Further, the encryption algorithm key AK may include a spare encryption algorithm key AK that is applied to the spare encryption algorithm A.

The encryption/decryption unit 127 has similar functions and configuration to the decryption unit 107 in the first example embodiment. The encryption/decryption unit 127 encrypts or decrypts the received data according to control by the mode switching unit 121. For example, the encryption/decryption unit 127 acquires the current encryption algorithm A and the encryption algorithm key AK, and encrypts the received data by using them. The encryption/decryption unit 127 then supplies the encrypted data to the terminal communication unit 120. Further, in the normal mode, the encryption/decryption unit 127 acquires the current encryption algorithm A and the encryption algorithm key AK, and decrypts the received data by using them. The encryption/decryption unit 127 then stores the decrypted data into the terminal storage unit 122. In the update mode, the encryption/decryption unit 127 decrypts data of the encrypted new encryption algorithm A by using the second one-time key in the key table TT. The encryption/decryption unit 127 then supplies the decrypted new encryption algorithm A to the algorithm update unit 129.

In response to use of the second one-time key, the terminal key update unit 128 erases the used second one-time key from the key table TT in the key storage unit 123 and thereby updates the key table TT.

The algorithm update unit 129 stores the decrypted new encryption algorithm A into the algorithm storage unit 126. Further, the algorithm update unit 129 may erase the current encryption algorithm A and update the new encryption algorithm A as the current encryption algorithm A.

(Encryption Management Device 30)

The encryption management device 30 includes an acquisition unit 300, a management storage unit 302, an encryption unit 304, a management key update unit 306, and a management communication unit 308.

The acquisition unit 300 acquires plaintext data of the new encryption algorithm A. The acquisition unit 300 may be connected to an input device (not shown) and acquire plaintext data of the new encryption algorithm A by receiving input from an administrator. Further, the acquisition unit 300 may acquire plaintext data of the new encryption algorithm A from another device (not shown) at the other end of communication through the management communication unit 308, which is described later. The acquisition unit 300 supplies the acquired plaintext data to the encryption unit 304.

The management storage unit 302 stores a key table MT that contains a first one-time key to be used for encryption of the management communication unit 308. The key table MT is a table of random numbers of one-time pad method corresponding to the key table TT. The first one-time key is a key in one-time pad method, which corresponding to the second one-time key. In this second example embodiment, the first one-time key has the same information as the second one-time key. In other words, the first one-time key is the same random number sequence of true random numbers as the second one-time key.

When the encryption management device 30 is connected to a plurality of encryption terminals 12 so that they can communicate with each other, the management storage unit 302 may store a plurality of key tables MT. In this case, the management storage unit 302 may store the key table MT that contains the first one-time key corresponding to the second one-time key in each of the plurality of encryption terminals 12.

The management storage unit 302 supplies the first one-time key to the encryption unit 304.

The encryption unit 304 encrypts the new encryption algorithm A for creating ciphertext from plaintext by using the first one-time key. The encryption unit 304 supplies the encrypted new encryption algorithm A to the management communication unit 308.

In response to use of the first one-time key, the management key update unit 306 erases the used first one-time key from the key table MT in the management storage unit 302 and thereby updates the key table MT.

The management communication unit 308 is connected to the encryption terminal 12 so that they can communicate with each other, and transmits data of the encrypted new encryption algorithm A to the encryption terminal 12. In the case where the management communication unit 308 is connected to a plurality of encryption terminals 12, the management communication unit 308 transmits data of the new encryption algorithm A that is encrypted using the first one-time key corresponding to each of the plurality of encryption terminals 12 to each of the plurality of encryption terminals 12.

Figure 4:
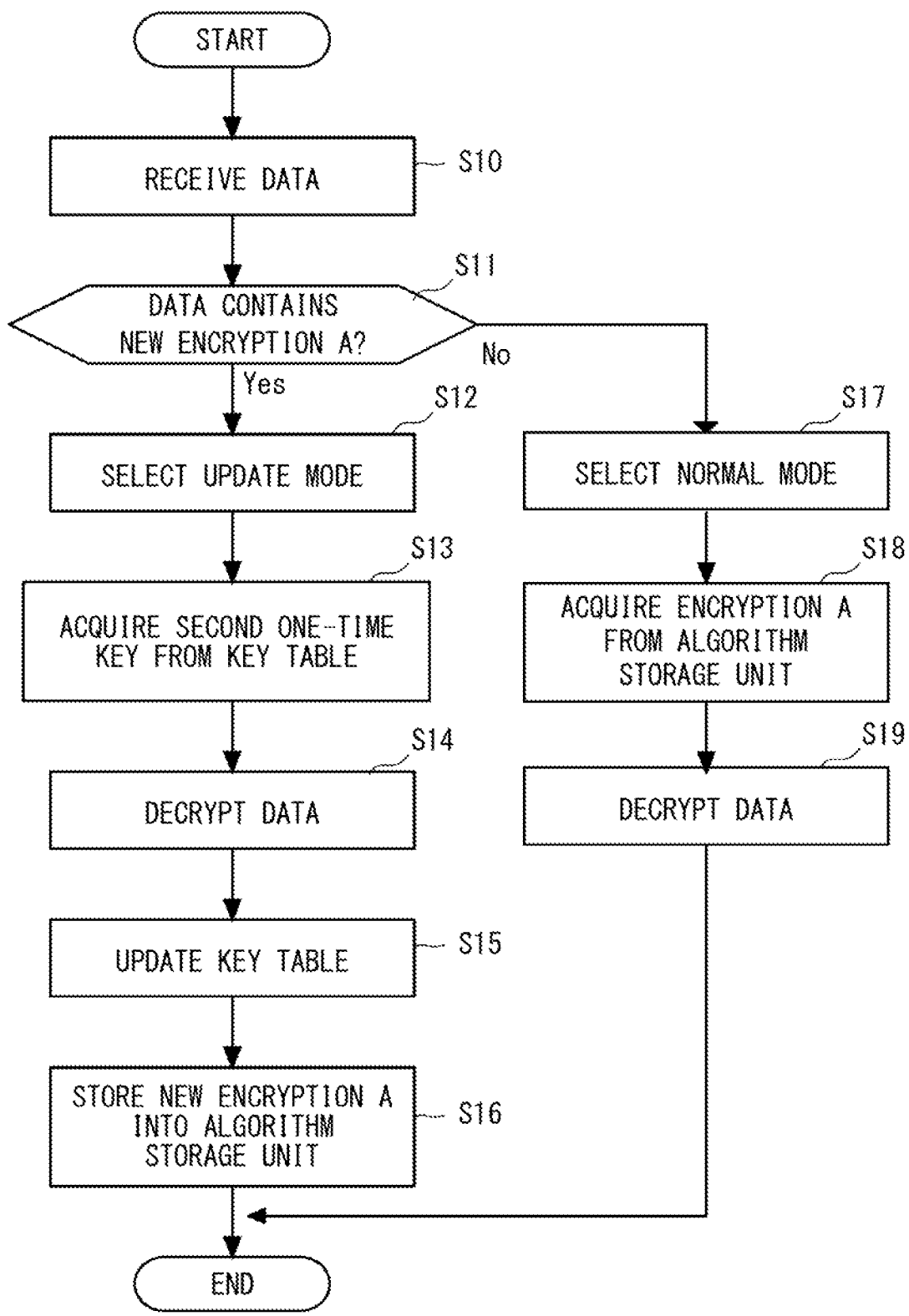
FIG. 4 is a flowchart showing a decryption process of the encryption terminal according to the second example embodiment.

A decryption process of the encryption terminal 12 according to the second example embodiment is described hereinafter with reference to FIG. 4. FIG. 4 is a flowchart showing a decryption process of the encryption terminal 12 according to the second example embodiment.

First, in Step S10, the terminal communication unit 120 of the encryption terminal 12 receives data from the encryption management device 30 or another encryption terminal 12. The data received in this second example embodiment may contain main body data and destination-related data. The destination-related data may contain address information of the information terminal 22 to which the encryption terminal 12 is connected or address information of the encryption terminal 12. The address information may be an Internet Protocol address (IP address) or a domain name. The terminal communication unit 120 supplies the main body data in the received data to the encryption/decryption unit 127. Further, the terminal communication unit 120 supplies the destination-related data in the received data to the mode switching unit 121.

Next, in Step S11, the mode switching unit 121 determines whether the data received by the terminal communication unit 120 contains the new encryption algorithm A or not. At this time, the mode switching unit 121 may determine whether the received data contains the new encryption algorithm A or not by determining whether the address information contained in the destination-related data is the address information of the encryption terminal 12. When the mode switching unit 121 determines that the received data contains the new encryption algorithm A (Yes in Step S11), it makes the process proceed to Step S12. Otherwise (No in Step S11), the mode switching unit 121 makes the process proceed to Step S17.

In Step S12, the mode switching unit 121 selects "update mode" as the decryption mode, and supplies a control signal for the update mode to the encryption/decryption unit 127.

Then, in Step S13, the encryption/decryption unit 127 acquires the second one-time key from the key table TT in the key storage unit 123 of the terminal storage unit 122 according to control of the mode switching unit 121.

In Step S14, the encryption/decryption unit 127 decrypts the main body data by using the second one-time key according to control of the mode switching unit 121. At this time, the encryption/decryption unit 127 may decrypt the main body data by calculating exclusive-OR between a bit string of the main body data and a bit string of the second one-time key. Then, the encryption/decryption unit 127 supplies the decrypted main body data to the algorithm update unit 129. Further, the encryption/decryption unit 127 sends a notification indicating completion of decryption to the terminal key update unit 128.

In Step S15, in response to completion of the decryption in Step S14, i.e., in response to use of the second one-time key, the terminal key update unit 128 erases the used second one-time key from the key table TT in the key storage unit 123 and thereby updates the key table TT.

In Step S16, the algorithm update unit 129 stores the decrypted main body data as the new encryption algorithm A into the algorithm storage unit 126 of the terminal storage unit 122. The algorithm update unit 129 then ends the process.

Note that, in Step S17, when the mode switching unit 121 determines that the received data does not contain the new encryption algorithm A in Step S11 (No in Step S11), the mode switching unit 121 selects "normal mode" as the decryption mode. The mode switching unit 121 then supplies a control signal for the normal mode to the encryption/decryption unit 127.

Then, in Step S18, the encryption/decryption unit 127 acquires the current encryption algorithm A and the current encryption algorithm key AK from the algorithm storage unit 126 of the terminal storage unit 122 according to control of the mode switching unit 121.

After that, in Step S19, the encryption/decryption unit 127 decrypts the main body data by using the current encryption algorithm contained in the current encryption algorithm A and the current encryption algorithm key AK. Then, the encryption/decryption unit 127 may store the decrypted main body data into the terminal storage unit 122. The encryption/decryption unit 127 then ends the process.

Note that the data received in Step S10 may contain sender-related data in addition to or instead of destination-related data. The sender-related data may contain address information of a sender. In this case, in Step S11, the mode switching unit 121 may determine whether the received data contains the new encryption algorithm A or not by determining whether the address information contained in the sender-related data is the address information of the encryption management device 30.

Figure 5:
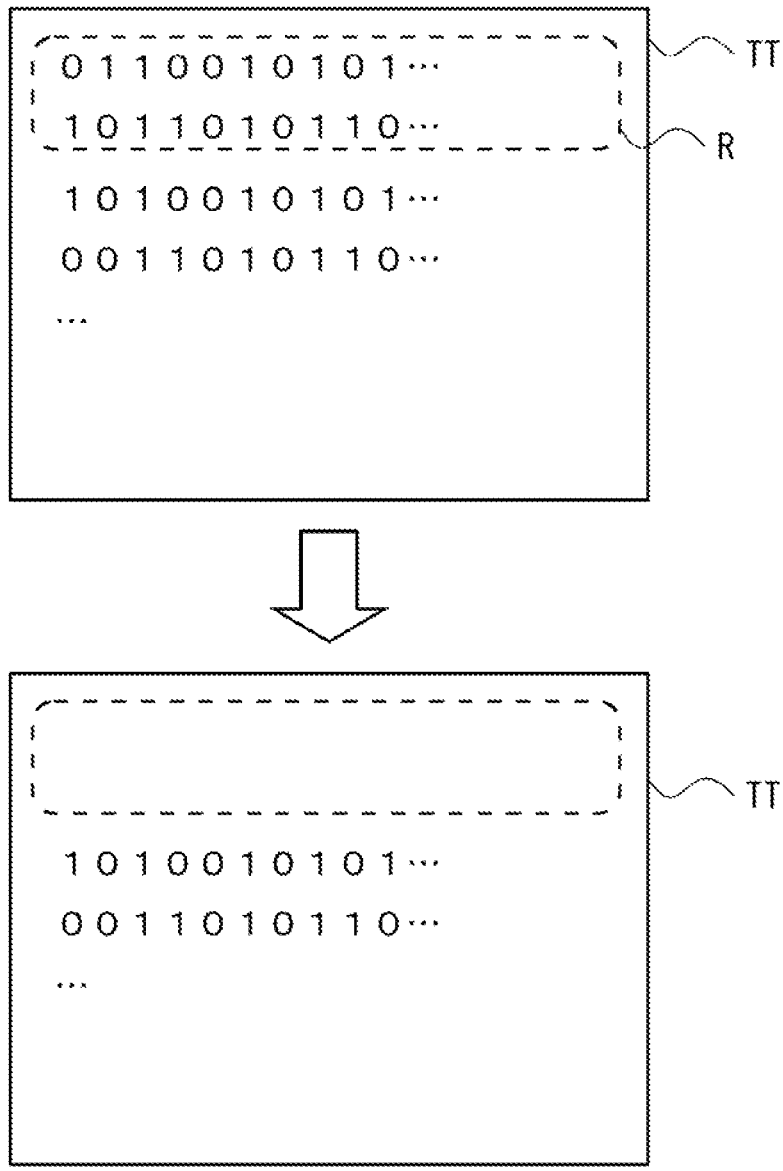
FIG. 5 is a view illustrating an example of an acquisition process of a second one-time key and an update process of a key table according to the second example embodiment.

FIG. 5 is a view illustrating an example of acquisition of the second one-time key (i.e., processing of Step S13 in FIG. 4) and update of the key table TT (i.e., processing of Step S15 in FIG. 4) according to the second example embodiment.

As shown in this figure, the key table TT has a random number sequence containing a large number of random numbers.

For example, in Step S13, the encryption/decryption unit 127 acquires, as the second one-time key, a random number sequence R of random numbers whose number corresponds to the data amount equivalent to the data amount of main body data from the key table TT. At this time, the encryption/decryption unit 127 may acquire, as the second one-time key, a random number sequence R of random numbers whose number corresponds to the same number of bits as the main body data sequentially from a memory space in ascending order of memory address among memory spaces allocated to the key table TT.

Then, in Step S15, the terminal key update unit 128 erases data of the memory space that stores the random number sequence R of the used second one-time key among the memory spaces allocated to the key table TT.

Note that when the encryption/decryption unit 127 acquires the second one-time key from the key table TT next time in Step S13, it may read a predetermined number of stored random numbers in ascending order of memory address in memory spaces storing random numbers.

Figure 6:
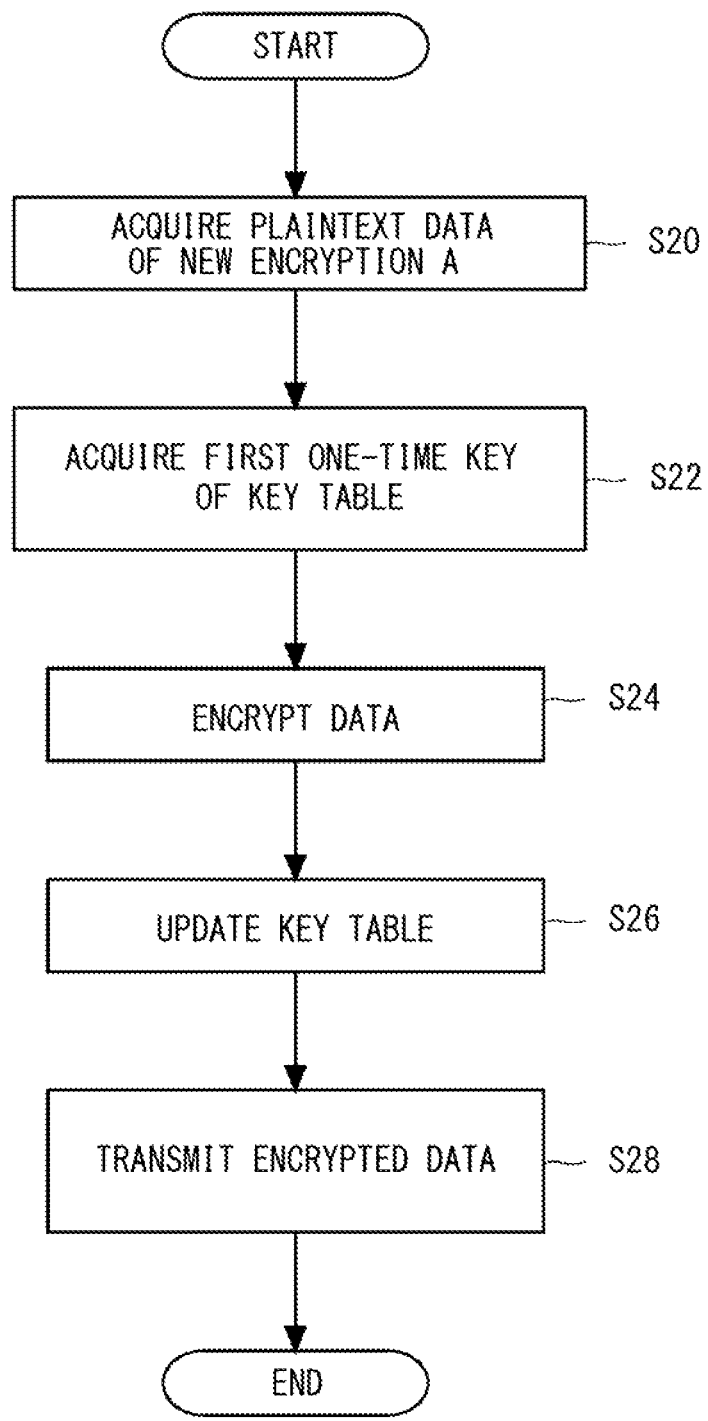
FIG. 6 is a flowchart showing a process of the encryption management device according to the second example embodiment.

A process of the encryption management device 30 is described hereinafter with reference to FIG. 6. FIG. 6 is a flowchart showing a process of the encryption management device 30 according to the second example embodiment.

First, in Step S20, the acquisition unit 300 of the encryption management device 30 acquires plaintext data of the new encryption algorithm A from an administrator. Then, the acquisition unit 300 supplies the acquired data to the encryption unit 304. Note that the acquisition unit 300 may acquire destination-related data from the administrator. Then, the acquisition unit 300 may supply the destination-related data to the management communication unit 308.

Next, in Step S22, the encryption unit 304 acquires the first one-time key from the key table MT of the management storage unit 302. At this time, the encryption unit 304 acquires, as the first one-time key, random numbers whose number corresponds to the data amount equivalent to the data amount of plaintext data from the key table MT. Note that the acquisition of the first one-time key may be performed in a similar procedure to the acquisition of the second one-time key shown in FIG. 5.

Then, in Step S24, the encryption unit 304 encrypts the plaintext data of the new encryption algorithm A by using the first one-time key. At this time, the encryption unit 304 may encrypt the plaintext data by calculating exclusive-OR between a bit string of the plaintext data and a bit string of the first one-time key. Then, the encryption unit 304 supplies data of the encrypted new encryption algorithm A to the management communication unit 308. Further, the encryption unit 304 sends a notification indicating completion of encryption to the management key update unit 306.

In Step S26, in response to completion of the encryption in Step S24, i.e., in response to use of the first one-time key, the management key update unit 306 erases the used first one-time key from the key table MT in the management storage unit 302 and thereby updates the key table MT. Note that the update of the key table MT may be performed in a similar procedure to the update of the key table TT shown in FIG. 5.

After that, in Step S28, the management communication unit 308 sets the data of the encrypted new encryption algorithm A as main body data, and transmits this main body data with destination-related data to the encryption terminal 12 connected to the destination information terminal 22. The management communication unit 308 then ends the process.

As described above, the encryption management device 30 according to the second example embodiment transmits an encryption algorithm that is encrypted using an information-theoretically secure key in one-time pad method, and the encryption terminal 12 receives it. This prevents leakage of the key used. This therefore enhances the security of delivering an encryption algorithm. The security of encrypted communication is thereby improved.

Further, since the encryption management device 30 is capable of delivering newly created encryption algorithms one after another, there is no need to excessively incorporate spare encryption algorithms into the encryption terminal 12. This minimizes the workload of installing the encryption terminal 12 and thereby minimizes the initial cost.

Further, since a decryption process of encrypted data using a one-time key in one-time pad method is executable with less computational resources, the encryption terminal 12 is applicable also to equipment with less computational resources such as IoT equipment, for example.

In the case where the encryption management device 30 is connected to a plurality of encryption terminals 12, the encryption management device 30 encrypts the new encryption algorithm A by using the first one-time key corresponding to the second one-time key corresponding to each of the plurality of encryption terminals 12. This further enhances the security of delivering the encryption algorithm A and thereby further improves the security of encrypted communication.

Although the encryption terminal 12 is connected to the information terminal 22 so that they can communicate in the second example embodiment, the encryption terminal 12 may be incorporated into the information terminal 22. In other words, the encryption terminal 12 and the information terminal 22 may be a single terminal device. In this case, in Step S11 of FIG. 4, the mode switching unit 121 may determine whether the received data is the new encryption algorithm A or not by determining whether the address information contained in the sender-related data is the address information of the encryption management device 30.

Third Example Embodiment

A third example embodiment of the present disclosure will be described hereinafter with reference to FIGS. 7 and 8. In the third example embodiment, a key storage unit of a terminal storage unit of an encryption terminal is composed of a plurality of memories.

Figure 7:
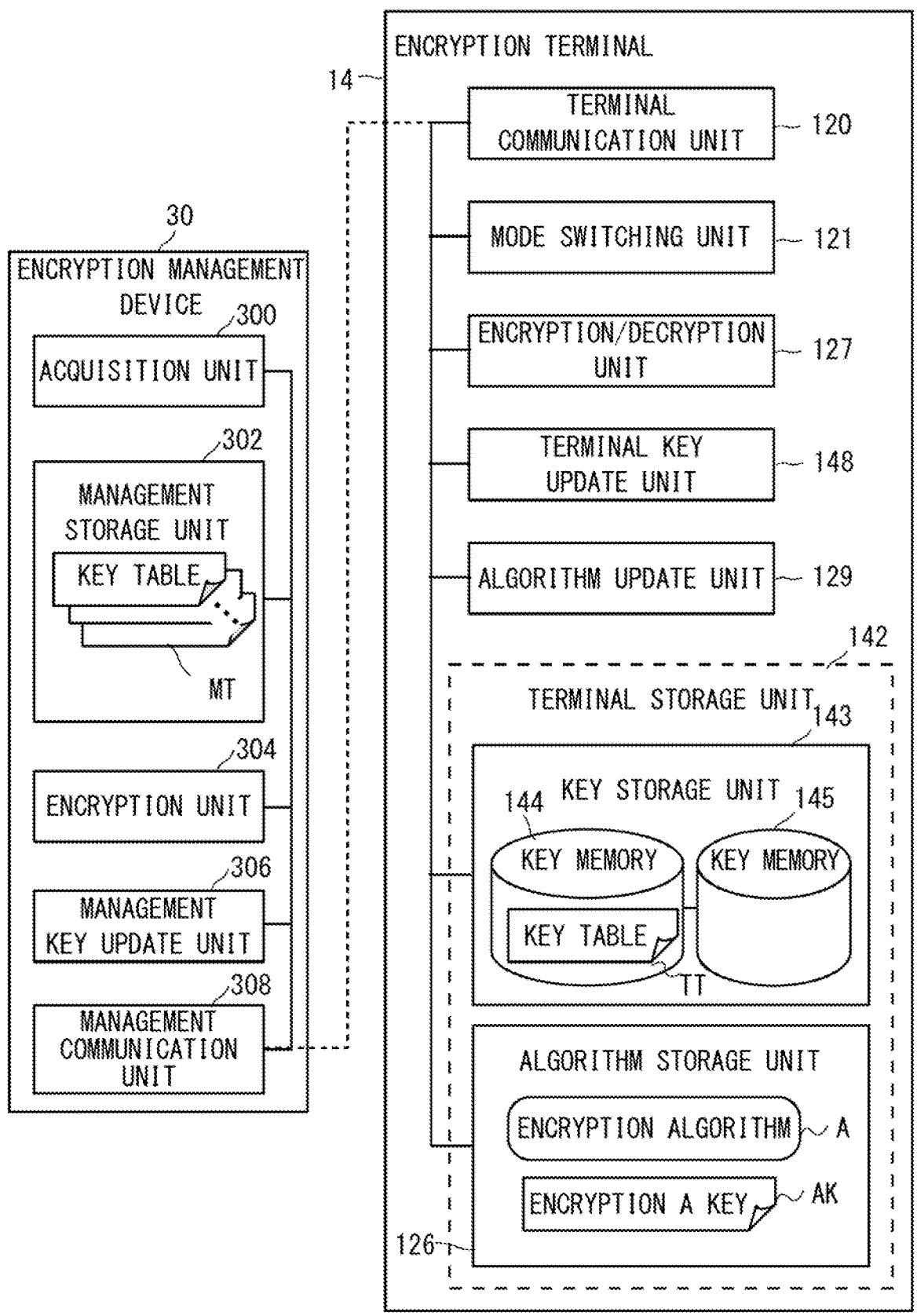
FIG. 7 is a block diagram showing the configuration of an encryption terminal and an encryption management device 30 according to a third example embodiment.

FIG. 7 is a block diagram showing the configuration of an encryption terminal 14 and the encryption management device 30 according to the third example embodiment. The encryption management device 30 according to the third example embodiment is similar to the encryption management device 30 according to the second example embodiment, and therefore description thereof is omitted. The encryption terminal 14 according to the third example embodiment has basically similar configuration and functions to the encryption terminal 12 according to the second example embodiment. Note, however, that the encryption terminal 14 is different from the encryption terminal 12 in that it includes a terminal storage unit 142 and a terminal key update unit 148 in place of the terminal storage unit 122 and the terminal key update unit 128, respectively.

The terminal storage unit 142 has similar configuration and functions to the terminal storage unit 122 except that it includes a key storage unit 143 in place of the key storage unit 123.

The key storage unit 143, just like the key storage unit 123, stores the key table TT that contains the second one-time key. However, the key storage unit 143 includes a plurality of key memories that alternately store information of the key table TT excluding the used second one-time key. In this third example embodiment, the key storage unit 143 is composed of key memories 144 and 145. Each of the key memories 144 and 145 is a single non-transitory computer readable medium. In this third example embodiment, the key memories 144 and 145 may be flash ROM (Read Only Memory).

The terminal key update unit 148 has similar configuration and functions to the terminal key update unit 128, and further, in response to use of the second one-time key, it completely erases information of the key table TT in the key memory that stores information of the used second one-time key.

Note that, in the third example embodiment, decryption in the encryption terminal 14 is performed by similar steps to the steps shown in FIG. 4. However, the terminal key update unit 148 of the encryption terminal 14 performs update of the key table TT, which is described later, instead of Step S15.

Figure 8:
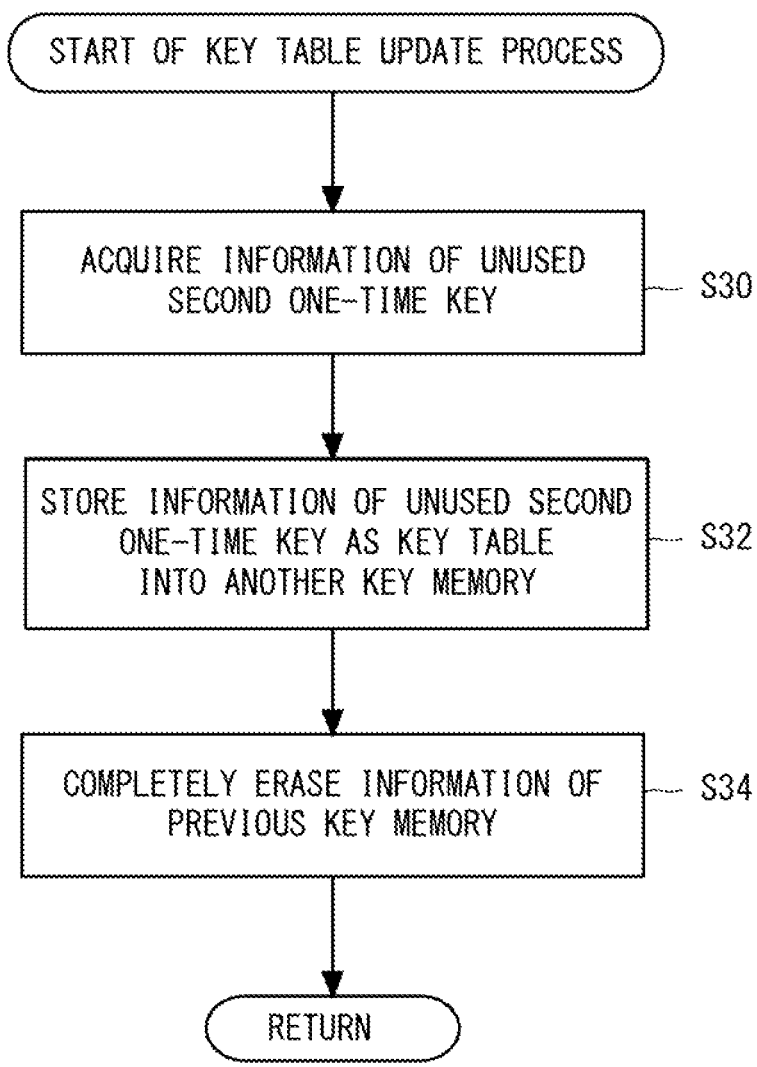
FIG. 8 is a flowchart showing an update process of a key table of the encryption terminal according to the third example embodiment.

FIG. 8 is a flowchart showing an update process of a key table in the encryption terminal 14 according to the third example embodiment. It is assumed that the key table TT is stored in the key memory 144 before Step S14. First, in Step S30, in response to use of the second one-time key in Step S14, the terminal key update unit 148 of the encryption terminal 14 acquires information of an unused second one-time key different from the used second one-time key among information of the key table TT. For example, the terminal key update unit 148 selectively copies only information of an unused second one-time key among information of the key table TT.

Next, in Step S32, the terminal key update unit 148 stores the information of the unused second one-time key as a new key table TT into the key memory 145 different from the key memory 144 that stores the key table TT. For example, the terminal key update unit 148 stores only the copied information of the unused second one-time key into the key memory 145.

Then, in Step S34, the terminal key update unit 148 completely erases, by flush or the like, data of the key memory 144 in which the information of the used second one-time key has been stored. "Completely erasing" means erasing data so that is not restorable. The terminal key update unit 148 thereby completely erases information of the key table TT in the key memory 144.

Although the key storage unit 143 is composed of the two key memories 144 and 145 in the third example embodiment, it may be composed of two or more key memories.

As described above, according to the third example embodiment, the key table TT in the key memory 144 that stores the used second one-time key is completely erased by erasing the whole memory. This prevents data to be erased from remaining due to wear leveling or the like, which occurs when erasing only data of a memory block that stores the second one-time key in the memory space of the key memory 144. This avoids restoration of the second one-time key used for decryption of the new encryption algorithm A and thereby reduces the possibility that stolen data is decrypted even when the new encryption algorithm A is stolen during delivery. This further enhances the security of delivering the encryption algorithm A and thereby further improves the security of encrypted communication. Note that since the key table TT that contains remaining random numbers different from the second one-time key is stored into the other key memory 145, the key table TT is usable again for the subsequent decryption.

Further, the management storage unit 302 of the encryption management device 30 may include a plurality of management key memories that alternately store information of the key table MT excluding the used first one-time key, just like the terminal key update unit 128. In this case, in Step S26 shown in FIG. 6, the management key update unit 306 of the encryption management device 30 may update the key table MT by performing similar processing to the update of the key table TT by the terminal key update unit 148. In this case, the "management key update unit 306" is substituted for the "terminal key update unit 148", the "management storage unit 302" is substituted for the "key storage unit 143", the "key table MT" is substituted for the "key table TT", and the "first one-time key" is substituted for the "second one-time key", in Steps S30 to 34 in FIG. 8. This avoids restoration of the first one-time key used for encryption of the new encryption algorithm A erased after use even when the encryption management device 30 is attacked by an outsider. This further enhances the security of delivering the encryption algorithm A and thereby further improves the security of encrypted communication.

Fourth Example Embodiment

A fourth example embodiment of the present disclosure will be described hereinafter with reference to FIGS. 9 and 10. In the fourth example embodiment, an encryption terminal alters data of an encryption algorithm A in the event of emergency.

Figure 9:
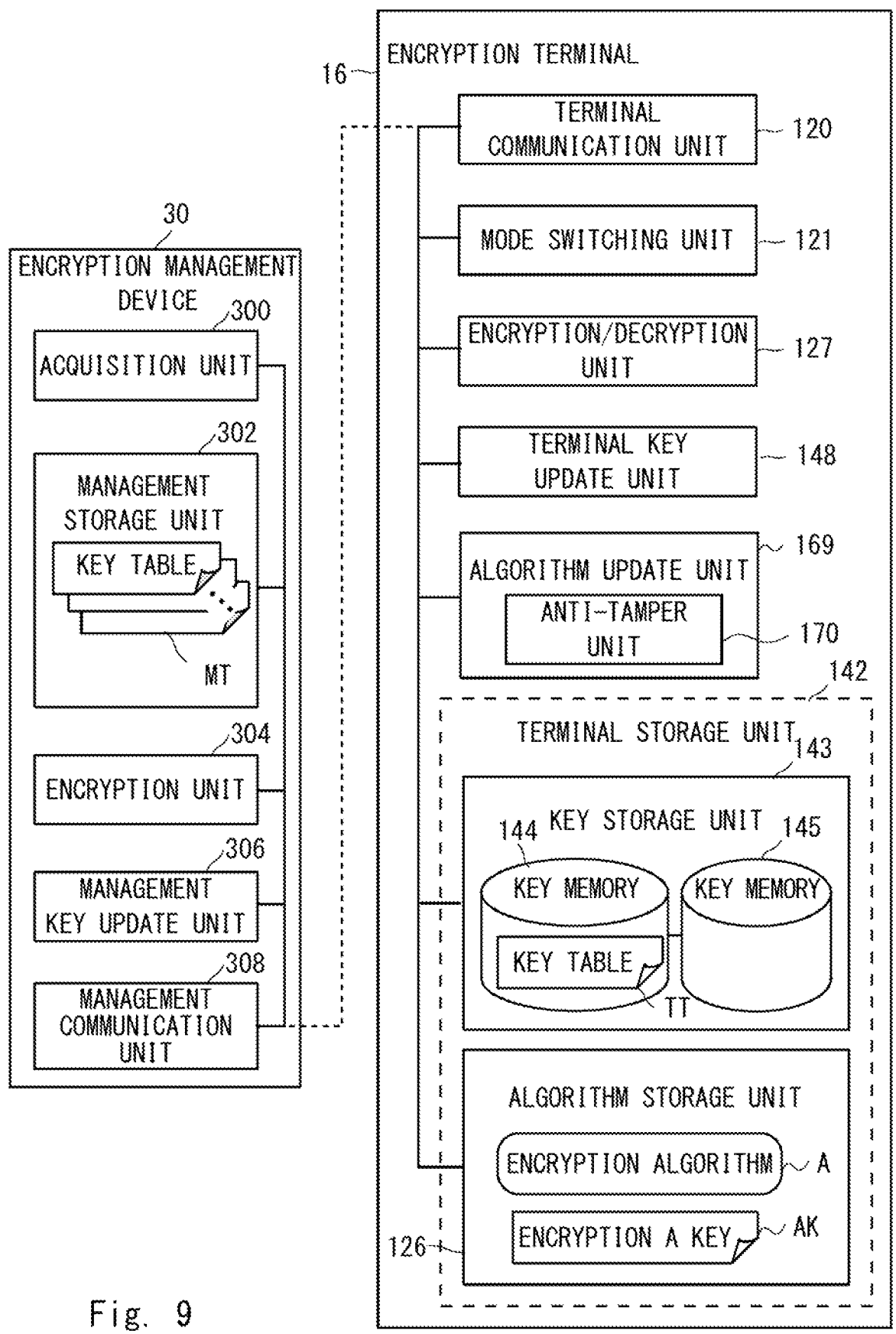
FIG. 9 is a block diagram showing the configuration of an encryption terminal and an encryption management device according to a fourth example embodiment.

FIG. 9 is a block diagram showing the configuration of an encryption terminal 16 and the encryption management device 30 according to the fourth example embodiment. The encryption management device 30 according to the fourth example embodiment is similar to the encryption management device 30 according to the second and third example embodiments, and therefore description thereof is omitted. The encryption terminal 16 according to the fourth example embodiment has basically similar configuration and functions to the encryption terminal 14 according to the third example embodiment. Note that, however, the encryption terminal 16 includes an algorithm update unit 169 in place of the algorithm update unit 129.

The algorithm update unit 169 includes an anti-tamper unit 170 in addition to the configuration and functions of the algorithm update unit 129. The anti-tamper unit 170 alters information stored in the algorithm storage unit 126 in response to detection of a specified operation. The specified operation may be shutdown of a communication connection with the network 8, for example. In this case, the anti-tamper unit 170 may check the reachability of a node on the network 8 by checking the response status of a message through the terminal communication unit 120 on a regular or irregular basis. Then, the anti-tamper unit 170 may detect a specified operation on the basis of a result of checking the reachability. For example, the anti-tamper unit 170 may detect a specified operation when a response from a message receiver is not received within a predetermined period of time.

Alternatively, the specified operation may be detection of a change in physical quantity such as ambient atmospheric pressure or temperature. In this case, the encryption terminal 16 is managed to maintain the internal atmospheric pressure, temperature or the like, and the anti-tamper unit 170 may be connected to a sensor (not shown) that detects a change in such a physical quantity.

Alternatively, the specified operation may be detection of electromagnetic waves with higher intensity than a predetermined threshold. In this case, the encryption terminal 16 may be accommodated in a case for shielding electromagnetic waves, and the anti-tamper unit 170 may be connected to a sensor (not shown) that detects electromagnetic waves.

Note that the anti-tamper unit 170 may be provided with power from a backup power supply separated from a main power supply of the encryption terminal 16.

Figure 10:
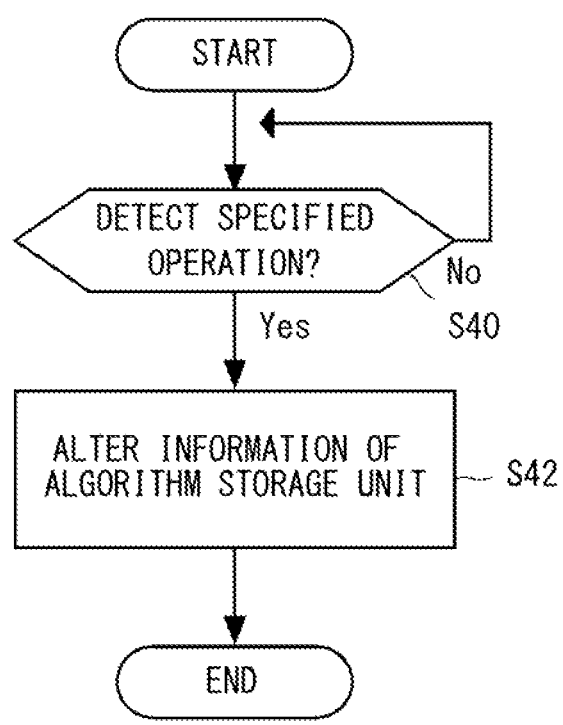
FIG. 10 is a flowchart showing a process of an anti-tamper unit according to the fourth example embodiment.

FIG. 10 is a flowchart showing a process of the anti-tamper unit 170 according to the fourth example embodiment.

First, in Step S40, the anti-tamper unit 170 determines whether a specified operation is detected or not. For example, the anti-tamper unit 170 may determine whether a specified operation is detected or not on the basis of a detection result of a connected sensor. When the anti-tamper unit 170 determines that a specified operation is detected (Yes in Step S40), it makes the process proceed to Step S42. Otherwise (No in Step S40), the anti-tamper unit 170 repeats the processing shown in S40.

Next, in Step S42, the anti-tamper unit 170 alters information stored in the algorithm update unit 169. At this time, the anti-tamper unit 170 may completely erase, by flush or the like, all of information stored in the algorithm update unit 129. Further, the anti-tamper unit 170 may randomly selects a bit contained in information stored in the algorithm update unit 169, and irreversibly alter the information by shifting the selected bit. Furthermore, the anti-tamper unit 170 may physically break down the memory that constitutes the algorithm update unit 129. The anti-tamper unit 170 then ends the process.

As described above, according to the fourth example embodiment, the encryption terminal 16 makes the new encryption algorithm A stored in the algorithm update unit 169 irreversibly unreadable in response to detecting a specified operation. This prevents leakage of the encryption algorithm A to an outsider even if the encryption terminal 16 is taken away by the outsider. Note that, even if the new encryption algorithm A is stolen during delivery and further the encryption terminal 16 is taken away, the second one-time key used for decryption of the new encryption algorithm A is erased, which prevents leakage of the new encryption algorithm A to the outsider. This further enhances the security of delivering an encryption algorithm and thereby improves the security of encrypted communication.

The present disclosure is described above as a hardware configuration in the first to fourth example embodiments. However, the present disclosure is not limited thereto. The present disclosure can be implemented by causing a processor 1010, which is described later, to execute a computer program to perform the above-described processing such as decryption, encryption, key table update, and anti-tampering.

Figure 11:
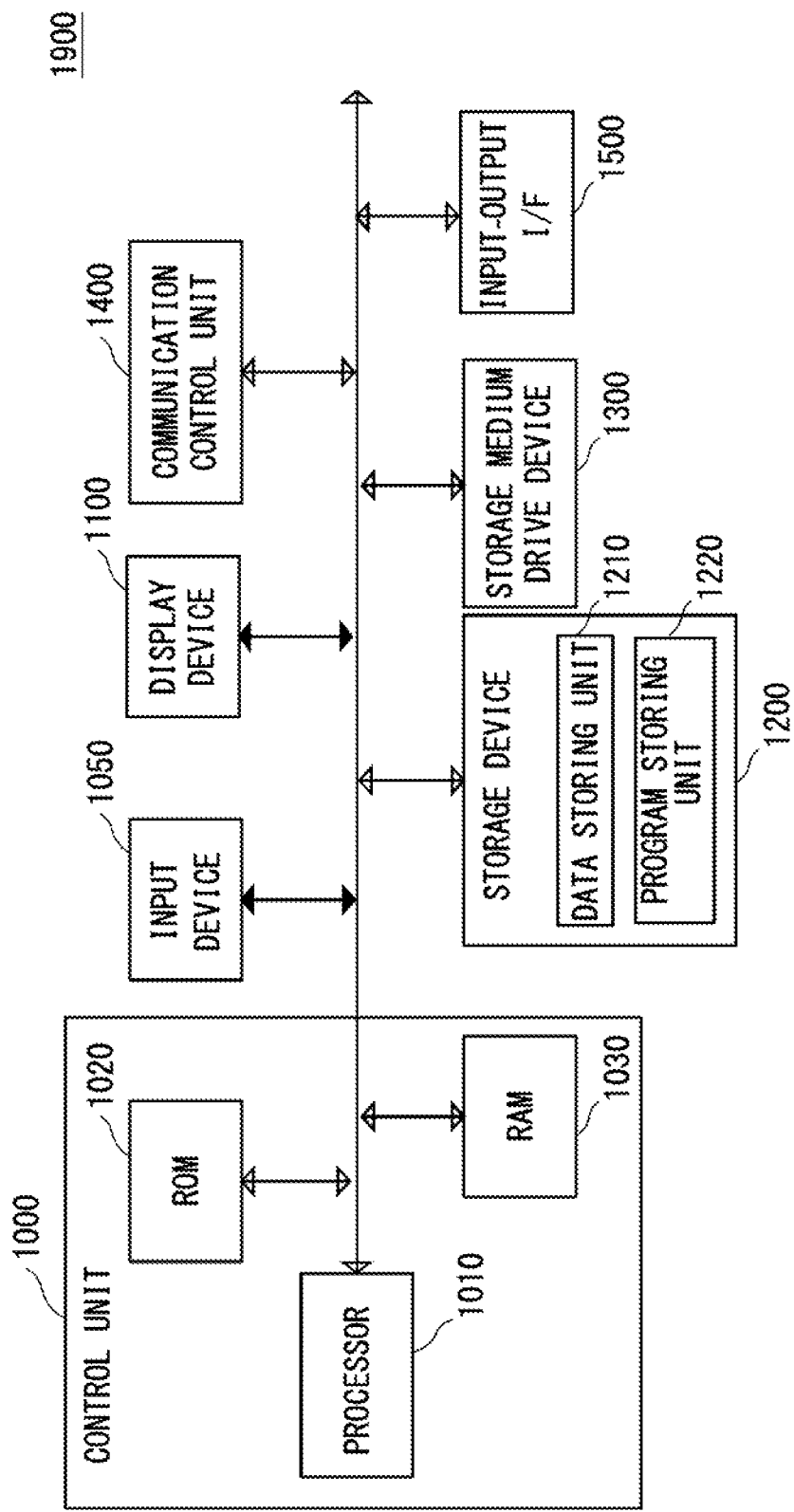
FIG. 11 is a schematic diagram of a computer according to the first to fourth example embodiments.

FIG. 11 is a schematic diagram of a computer 1900 according to the first to fourth example embodiments. As shown in FIG. 11, the computer 1900 includes a control unit 1000 for controlling the entire system. An input device 1050, a storage device 1200, a storage medium drive device 1300, a communication control unit 1400, and an input-output I/F 1500 are connected to this control unit 1000 through a bus line such as a data bus.

The control unit 1000 includes a processor 1010, a ROM 1020, and a RAM 1030.

The processor 101 performs various information processing and control according to programs stored in storage units such as the ROM 1020 and the storage device 1200.

The ROM 1020 is a read only memory that previously stores various programs and data for performing various control and operation.

The RAM 1030 is a random access memory that is used as a working memory by the processor 101. In the RAM 1030, areas to perform various processing according to the first to fourth example embodiments are reserved.

The input device 1050 is an input device that receives input from a user, such as a keyboard, a mouse, and a touch panel. For example, the keyboard includes various keys such as a numeric keypad, function keys for executing various functions, and cursor movement keys. The mouse is a pointing device, and it is an input device that specifies a corresponding function by clicking on a key, an icon or the like displayed on a display device 1100. The touch panel is input equipment placed on the surface of the display device 1100, and specifies a user's touch position corresponding to each operation key displayed on the screen of the display device 1100 and receives input of the operation key displayed corresponding to this touch position.

For the display device 1100, a CRT or a liquid crystal display, for example, is used. On this display device, input results by the keyboard or the mouse are displayed, or finally retrieved image information are displayed. Further, the display device 1100 displays images of operation keys for performing necessary operations through a touch panel in accordance with the functions of the computer 1900.

The storage device 1200 is composed of a readable and writable storage medium and a drive unit for reading or writing various types of information such as programs and data in this storage medium.

Although a storage medium used for this storage device 1200 is mainly a hard disk or the like, a non-transitory computer readable medium used for the storage medium drive device 1300, which is described later, may be used.

The storage device 1200 includes a data storing unit 1210, a program storing unit 1220, and another storing unit (for example, a storing unit for backing up programs and data stored in this storage medium 1200), which is not shown, and the like. The program storing unit 1220 stores programs for executing the processing in the first to fourth example embodiments. The data storing unit 1210 stores various types of data of databases according to the first to fourth example embodiments.

The storage medium drive device 1300 is a drive device for the processor 1010 to read a computer program, data containing a document and the like from an outside storage medium (external storage medium).

The external storage medium is a non-transitory computer readable medium in which computer programs, data and the like are stored. Non-transitory computer readable media include any type of tangible storage medium. Examples of the non-transitory computer readable media include magnetic storage media (such as flexible disks, magnetic tapes, hard disk drives, etc.), and optical magnetic storage media (e.g. magneto-optical disks), CD-ROM (Read Only Memory), CD-R, and CD-R/W, semiconductor memories (e.g., mask ROM, PROM (Programmable ROM), EPROM (Erasable PROM), flash ROM, and RAM (Random Access Memory)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line, and the storage medium drive device 1300.

Specifically, in the computer 1900, the processor 1010 of the control unit 1000 reads a program from the external storage medium set by the storage medium drive device 1300 and stores it into the storage device 1200.

The computer 1900 executes processing by loading the relevant program to the RAM 1030 from the storage device 1200. Note that, however, the computer 1900 may execute a program by directly loading the program to the RAM 1030 from an external storage medium by the storage medium drive device 1300, rather than from the storage device 1200. Further, in some computers, a program or the like may be stored in the ROM 1020 in advance, and the processor 1010 may execute it. Further, the computer 1900 may download a program or data from another storage medium through the communication control unit 1400 and execute it.

The communication control unit 1400 is a control device for a network connection of the computer 1900 with an external electronic device such as another personal computer or a word processor. The communication control unit 1400 enables access to the computer 1900 from such an external electronic device.

The input-output I/F 1500 is an interface for connecting input and output devices through a parallel port, a serial port, a keyboard port, a mouse port or the like.

For the processor 1010, CPU (Central Processing Unit), GPU (Graphics Processing Unit), FPGA (field-programmable gate array), DSP (digital signal processor), ASIC (application specific integrated circuit) or the like may be used. Each processing in the system and the method shown in the claims, the specification and the drawings may be performed in any order unless explicitly defined by words such as "before" and "prior to" and unless output of the previous processing is used in the subsequent processing. Even if an operation flow in the claims, the specification and the drawings is described using words such as "first" and "second" for the sake of convenience, this does not mean that the flow needs to be performed in this order.

Although the present disclosure is described above with reference to the example embodiment, the present disclosure is not limited to the above-described example embodiment. Various changes and modifications as would be obvious to one skilled in the art may be made to the structure and the details of the present disclosure without departing from the scope of the disclosure. A part or the whole of the example embodiments disclosed above can be described as, but not limited to, the following supplementary notes.

(Supplementary Note 1)
An encryption terminal comprising:
a terminal communication unit configured to receive an encryption algorithm for creating ciphertext from plaintext, the encryption algorithm being encrypted using a first one-time key in a one-time pad method;
a terminal storage unit configured to store a key table containing a second one-time key corresponding to the first one-time key; and
a decryption unit configured to decrypt the encrypted encryption algorithm by using the second one-time key.

(Supplementary Note 2)
The encryption terminal according to the Supplementary note 1, wherein the terminal storage unit includes a plurality of key memories configured to alternately store information of the key table excluding a used second one-time key.

(Supplementary Note 3)
The encryption terminal according to the Supplementary note 2, further comprising:
a terminal key update unit configured to, in response to use of the second one-time key, store only information of an unused second one-time key contained in the information of the key table into a key memory different from a key memory storing the information of the key table, and completely erase the information of the key table in the key memory storing information of the used second one-time key.

(Supplementary Note 4)
The encryption terminal according to any one of the Supplementary notes 1 to 3, further comprising:
an algorithm storage unit configured to store the decrypted encryption algorithm; and
an anti-tamper unit configured to alter information stored in the algorithm storage unit in response to detection of a specified operation.

(Supplementary Note 5)
An encryption management device comprising:
an encryption unit configured to encrypt an encryption algorithm for creating ciphertext from plaintext by using a first one-time key in a one-time pad method; and
a management communication unit configured to transmit the encrypted encryption algorithm to an encryption terminal including a key table containing a second one-time key corresponding to the first one-time key.

(Supplementary Note 6)
The encryption management device according to the Supplementary note 5, further comprising:
a management storage unit configured to store a management key table containing the first one-time key, wherein
the management storage unit includes a plurality of management key memories configured to alternately store information of the management key table excluding the used first one-time key.

(Supplementary Note 7)
The encryption management device according to the Supplementary note 5 or 6, wherein
each of a plurality of encryption terminals includes a key table containing a second one-time key different from those contained in the key tables included in the other encryption terminals, and
the management communication unit transmits, to each of the plurality of encryption terminals, the encryption algorithm encrypted using a first one-time key corresponding to a second one-time key in each of the plurality of encryption terminals.

(Supplementary Note 8)
An encrypted communication system comprising:
an encryption management device including an encryption unit configured to encrypt an encryption algorithm for creating ciphertext from plaintext by using a first one-time key in a one-time pad method, and a management communication unit configured to transmit the encrypted encryption algorithm; and
an encryption terminal including a terminal communication unit configured to receive the encrypted encryption algorithm, a terminal storage unit configured to store a key table containing a second one-time key corresponding to the first one-time key, and a decryption unit configured to decrypt the encrypted encryption algorithm by using the second one-time key.

(Supplementary Note 9)

The encrypted communication system according to the Supplementary note 8, wherein the terminal storage unit includes a plurality of key memories configured to alternately store information of the key table excluding the used second one-time key.

(Supplementary Note 10)

The encrypted communication system according to the Supplementary note 8 or 9, wherein the encryption terminal further includes:
- an algorithm storage unit configured to store the decrypted encryption algorithm; and
- an anti-tamper unit configured to alter information stored in the algorithm storage unit in response to detection of a specified operation.

(Supplementary Note 11)

A method comprising:
- a communication step of receiving an encryption algorithm for creating ciphertext from plaintext, the encryption algorithm being encrypted using a first one-time key in a one-time pad method; and
- a decryption step of decrypting the encrypted encryption algorithm by using a second one-time key in a key table containing the second one-time key corresponding to the first one-time key.

(Supplementary Note 12)

A non-transitory computer readable medium storing a program causing a computer to execute:
- a communication step of receiving an encryption algorithm for creating ciphertext from plaintext, the encryption algorithm being encrypted using a first one-time key in a one-time pad method; and
- a decryption step of decrypting the encrypted encryption algorithm by using a second one-time key in a key table containing the second one-time key corresponding to the first one-time key.

REFERENCE SIGNS LIST

1 ENCRYPTED COMMUNICATION SYSTEM
8 NETWORK
10,12,14,16 ENCRYPTION TERMINAL
22 INFORMATION TERMINAL
30 ENCRYPTION MANAGEMENT DEVICE
100 TERMINAL COMMUNICATION UNIT
102,122,142 TERMINAL STORAGE UNIT
107 DECRYPTION UNIT
120 TERMINAL COMMUNICATION UNIT
121 MODE SWITCHING UNIT
123,143 KEY STORAGE UNIT
126 ALGORITHM STORAGE UNIT
127 ENCRYPTION/DECRYPTION UNIT
128,148 TERMINAL KEY UPDATE UNIT
129,169 ALGORITHM UPDATE UNIT
144,145 KEY MEMORY
170 ANTI-TAMPER UNIT
300 ACQUISITION UNIT
302 MANAGEMENT STORAGE UNIT
304 ENCRYPTION UNIT
306 MANAGEMENT KEY UPDATE UNIT
308 MANAGEMENT COMMUNICATION UNIT
MT KEY TABLE
TT KEY TABLE
A ENCRYPTION ALGORITHM
AK ENCRYPTION ALGORITHM KEY
R RANDOM NUMBER SEQUENCE

What is claimed is:

1. An encryption terminal comprising:
    at least one memory storing instructions;
    at least one terminal storage unit storing a key table containing a second one-time key corresponding to a first one-time key in a one-time pad method; and
    at least one processor configured to execute the instructions to:
    receive an encryption algorithm for creating ciphertext from plaintext, the encryption algorithm being encrypted using the first one-time key; and
    decrypt the encrypted encryption algorithm by using the second one-time key, wherein
    the at least one terminal storage unit includes a plurality of key memories configured to alternately store information of the key table excluding a used second one-time key, and
    the at least one processor is configured to execute the instructions to:
    store, in response to use of the second one-time key, only information of an unused second one-time key contained in the information of the key table into a key memory different from a key memory storing the information of the key table, and erase the information of the key table in the key memory storing information of the used second one-time key so that is not restorable.

2. The encryption terminal according to claim 1, further comprising:
    an algorithm storage unit configured to store the decrypted encryption algorithm; and
    wherein the at least one processor is to alter information stored in the algorithm storage unit in response to detection of a specified operation.

3. An encrypted communication system comprising:
    an encryption management device; and
    an encryption terminal;
    wherein the encryption management device comprises;
    at least one memory storing instructions; and
    at least one processor configured to execute the instructions to:
        encrypt an encryption algorithm for creating ciphertext from plaintext by using a first one-time key in a one-time pad method, and transmit the encrypted encryption algorithm,
    wherein the encryption terminal comprises:
    at least one memory storing instructions;
    at least one terminal storage unit storing a key table containing a second one-time key corresponding to the first one-time key; and
    at least one processor configured to execute the instructions to:
        receive the encrypted encryption algorithm, and decrypt the encrypted encryption algorithm by using the second one-time key,
    wherein the terminal storage unit of the encryption terminal includes a plurality of key memories configured to alternately store information of the key table excluding the used second one-time key, and
    wherein the at least one processor of the encryption terminal is to configured execute the instructions stored by the at least one memory of the encryption terminal to:
    store, in response to use of the second one-time key, only information of an unused second one-time key contained in the information of the key table into a key memory different from a key memory storing the information of the key table, and erase the information of the key table in the key memory storing information of the used second one-time key so that is not restorable.

4. The encrypted communication system according to claim 3, wherein the encryption terminal further includes:
an algorithm storage unit configured to store the decrypted encryption algorithm; and
wherein the at least one processor of the encryption terminal is to alter information stored in the algorithm storage unit in response to detection of a specified operation.

5. A method executed by a computer and comprising:
receiving an encryption algorithm for creating ciphertext from plaintext, the encryption algorithm being encrypted using a first one-time key in a one-time pad method;
decrypting the encrypted encryption algorithm by using a second one-time key in a key table containing the second one-time key corresponding to the first one-time key;
alternately storing information of the key table excluding a used second one-time key in a plurality of key memories; and
storing, in response to use of the second one-time key, only information of an unused second one-time key contained in the information of the key table into a key memory different from a key memory storing the information of the key table, and erasing the information of the key table in the key memory storing information of the used second one-time key so that is not restorable.

* * * * *